Aug. 23, 1955    O. CÜPPER ET AL    2,715,927
MATERIAL HOLDER FOR VEGETABLE SLICING MACHINE
Filed April 23, 1951    3 Sheets-Sheet 1
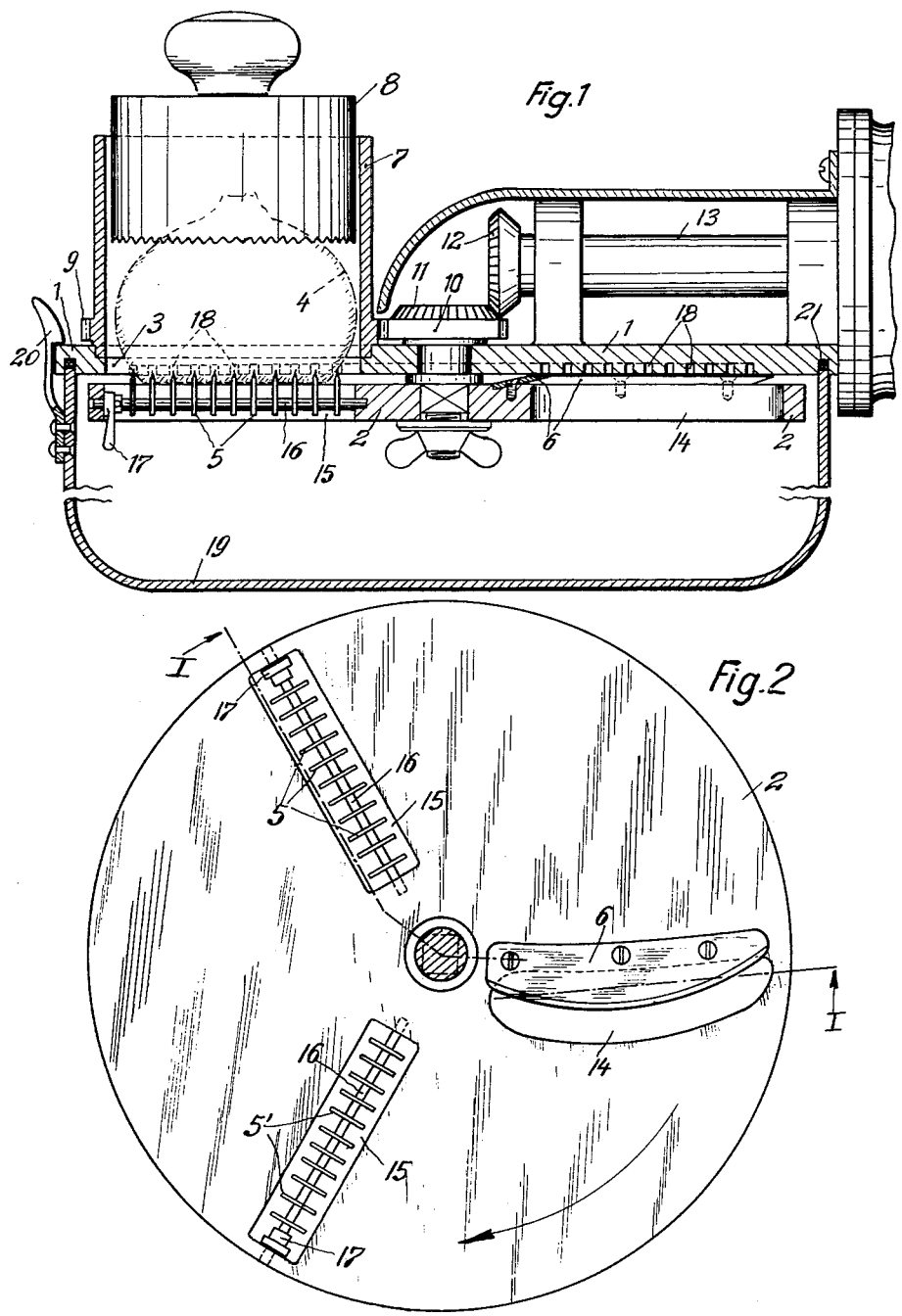
Inventors
Oscar Cüpper +
Alois Doleschi
By Young, Emery & Thompson
Attys.

Aug. 23, 1955  O. CÜPPER ET AL  2,715,927
MATERIAL HOLDER FOR VEGETABLE SLICING MACHINE
Filed April 23, 1951  3 Sheets-Sheet 2
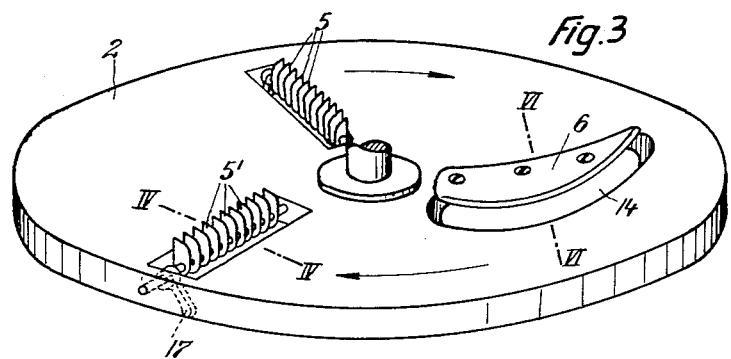
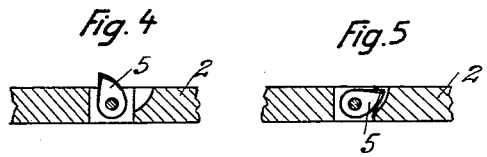
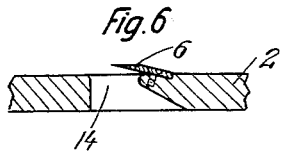
Inventors
Oscar Cupper +
Alois Doleschi
By Young, Emery & Thompson
Attys.

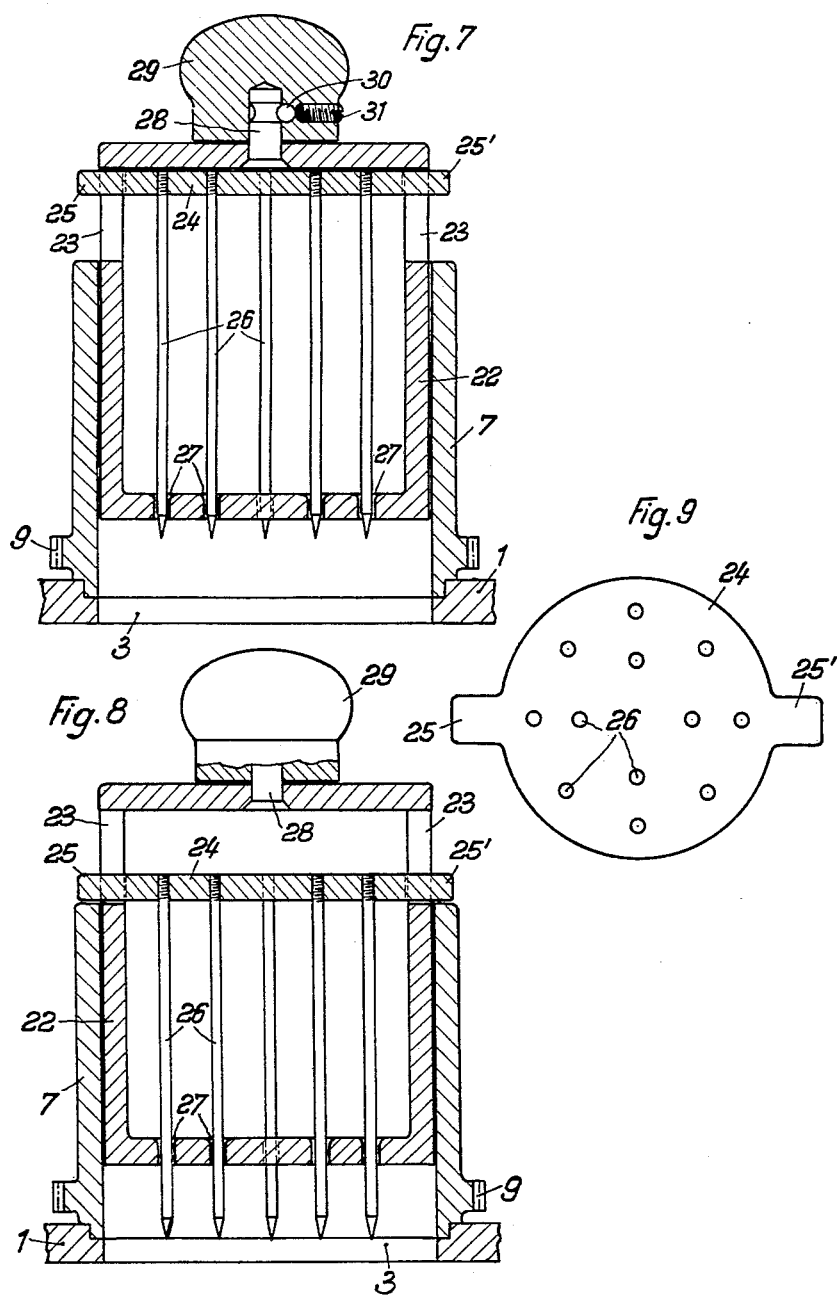

United States Patent Office 2,715,927
Patented Aug. 23, 1955

2,715,927

MATERIAL HOLDER FOR VEGETABLE SLICING MACHINE

Oscar Cüpper and Alois Doleschi, Diessen am Ammersee, Upper Bavaria, Germany

Application April 23, 1951, Serial No. 222,364

Claims priority, application Germany June 28, 1950

1 Claim. (Cl. 146—217)

This invention relates to a method and device for cutting and slicing onions and the like.

Many kinds of onion cutters are known. Most of such devices comprise a hand punch with a number of cutter blades at its lower end, adapted to operate on an onion inside a sleeve or the like, and by punching and stepwise rotation of the punch by hand, the onion is gradually cut up into pieces of larger or smaller size. Apart from the fact that the operation of these devices is tedious and fatiguing, the sleeve or casing gives only imperfect protection against the spraying out of onion juice, and the cut up product lacks homogeneity.

Other onion cutters have been proposed operating on the principle of bread graters, having a rotary cylindrical grater which tears small particles out of the article to be cut up. Onion cutters of this kind produce a shapeless paste and owing to the excessive disintegration a large part of the juice is lost. Also such devices operate slowly and shield the eyes of the user only imperfectly.

The present invention provides a new mode of operation, according to which a mechanically driven multi-blade cutter effects over the whole extent of the cutting surface of the onion, a number of concentric cuts, then after mechanically effected rotation of the onion through about 90°, a cyclically following similar multi-blade cutter makes similar cuts on the same cutting surface and to the same depth, and finally a cyclically following single blade cutter, after further rotation of the onion, cuts off the thereby produced cube shaped pieces which are conveyed to a collecting vessel, whereupon the three stage procedure is repeated until the onion is nearly or completely cut up, when other onions may be similarly treated.

The accompanying drawings illustrate by way of example one embodiment of the device for carrying out the method. In these drawings:

Fig. 1 is a vertical central section through the complete device taken on line I—I of Fig. 2, Fig. 2 is a top plan view of the knife disc, Fig. 3 is a perspective view of the knife disc, Fig. 4 is a vertical section taken on line IV—IV of Fig. 3, Fig. 5 is a vertical section taken on line V—V of Fig. 3 with the knife in the position of rest, Fig. 6 is a vertical section taken on line VI—VI of Fig. 3, Fig. 7 is a vertical central section of a hopper and modified pressure closure, Fig. 8 is a view similar to Fig. 7 with the parts in a different position, and Fig. 9 is a plan view of a slide plate.

The device has a base plate 1 connected by a flange to the drive mechanism, of which only the casing is shown, and which is detachably mounted in a known manner to the edge of a table. The base plate is substantially circular and has a passage 3 for the onion 4 to be cut up. At a short distance below the base plate a knife disc 2 is rotatably mounted, parallel to the base plate. The knife disc carries, pitched from each other by equal angles, substantially radially extending cutters, namely, two multi-blade cutters 5 and 5′ and a single blade cutter 6 (Figs. 2 and 3). The multi-blade cutters are depressed in slots 15 with their blades carried by shafts 16 the outer ends of which carry small levers 17 by means of which the blades can be more or less erected or projected (Fig. 4) or retracted (Fig. 5). Annular grooves 18 are formed in the bottom of the base plate 1 in which the edges of the erected cutter blades can freely travel.

The single blade cutter 6 is removably attached to the knife disc 2 and is pointed upwardly at a small angle so that its edge lies about 3 mm. above the surface of the knife disc. Below the knife 6 the disc has an opening 14 for removal of the cuttings (Figs. 2, 3 and 6).

A hopper 7 is rotatably mounted in the circular inlet passage 3 of the base plate, and is provided with a pressure closure 8. The hopper has at its lower edge a gear ring 9 engaging a pinion 10, which latter is fast to a bevel pinion 11 on the same axis and driven by a bevel gear 12 on a drive shaft 13. A collecting vessel 19 can be connected to the base plate 1, by means of spring latches 20 with interposition of a gasket 21, so that the vessel 19 can be easily removed and replaced.

The device operates as follows. An onion, or more than one, or any other vegetable, fruit and the like, according to the height of the hopper, is placed therein and the knife disc is rotated in the direction of the arrow (Figs. 2 and 3) by means of the drive mechanism 13, 12 and 11. The parts are arranged so that when the rotation begins, the multi-blade cutter 5 first comes into action. When it passes below the passage 3 in the base plate, it effects over the whole extent of the onion cutting surface a number of concentric cuts. Simultaneously the gear drive 10 and 9 rotates the hopper 7, and the velocity ratio is so chosen that the hopper, and the onion with it, are turned through about 90° when the following multi-blade cutter 5′ comes into action, which cutter then effects in the same cutting surface of the onion and to the same depth, cuts similar to those made by the first multi-blade cutter. In this way prism shaped pieces are formed coherent at their bases to the remainder of the onion body, which pieces are then severed by the following single blade cutter 6, and pass as cubes through the opening 14 into the collecting vessel 19. A drive lug or the like may be provided to ensure that the onion will turn along with the hopper. This three stage operation can be repeated until the onion is nearly or completely disintegrated, and then continued on further onions.

If it is desired to cut strips instead of cubes it is necessary only to turn the blades of one of the multi-blade cutters into retracted position. If it is desired to cut discs, both multi-blade cutters may have their blades so retracted.

The device will cut up a large onion in 2 to 3 seconds, whether cubes, strips, or discs are desired, without squeezing and almost without waste even after continuous operation for hours. It can also be used for cutting up apples and other fruits, as well as potatoes and other vegetables.

As illustrated in Fig. 1, the pressure closure or plunger 8 is provided with a plurality of sharp teeth or grooves and edges which grip the onions, but it is possible that during the cutting up of an onion it could change its position. This can result in an unsatisfactory cut and this objection can be overcome by a structure of a pressure closure or holder as shown in Figs. 7 to 9. In this structure the hopper 7 is provided with a closure member 22 which is formed as a hollow body. A slide plate 24 is movable in an axial direction on the hopper and this plate is provided with two diagonally opposite projecting portions 25 and 25' which project from two longitudinal slots 23 in the upper part of the hollow closure 22. In the slide plate 24 there are a plurality of axially extending needles or pins 26 secured therein which project through corresponding holes 27 in the bottom of the closure member 22. When the portions 25 and 25' are adjacent the upper edge of the longitudinal slots and the slide plate 24 being at the highest position of the pressure plunger, the points of the needles will just project from the bottom surface as shown in Fig. 7. In the projected position of the needles with the portions 25 and 25' on the hopper 7, the needles project from the bottom a distance of approximately two centimeters as shown in Fig. 8.

In the middle of the top wall or portion of the plunger 8 there is provided a pin 28 having a head portion 29 in the form of a knob which is rotatably mounted. The knob 29 is removable by means of a screw 31 cooperating with an adjustable ball 30 which latter projects into a circumferential groove in the pin 28 as shown in Fig. 7.

The structure of Figs. 7 to 9 operates as follows:

The plunger 22 is gripped by means of the knob 29 to lift the plunger 22 out of the hopper 7. The plate 24 due to its own weight will assume its projected position of the pins 26 as shown in Fig. 8 so that the fruit or vegetable to be sliced or diced will be impaled on the needles 26 and the plunger is now placed in the hopper 7 to proceed with the slicing, cutting or cubing.

The novel features of the device, more particularly the formation, arrangement, and guiding of the cutters can be applied to other disintegrating devices without departing from the invention.

We claim as our invention:

In a machine for cutting and slicing vegetables and the like, a combined hopper and pressure closure comprising a hopper for receiving the vegetables to be cut, a closure member in the form of a hollow body slidable in the hopper and having a plurality of holes in the bottom thereof and a pair of diametrically opposite slots, a slide plate movably mounted in the closure member and having a plurality of pins secured in and projecting from under the plate with a pin for each hole and diametrically opposite projecting portions guided in the slots, and means secured to the closure member for lifting the closure member and slide plate out of the hopper whereby the pins will project from the bottom of the closure member to impale the vegetable to be cut on the pins, and thereafter inserting the closure member with the impaled vegetable in the hopper.

References Cited in the file of this patent

UNITED STATES PATENTS

| | | |
|---|---|---|
| 65,504 | Pryor | June 4, 1867 |
| 852,844 | Ono | May 7, 1907 |
| 1,568,786 | Wickop | Jan. 5, 1926 |
| 1,951,466 | Alexander | Mar. 20, 1934 |
| 2,237,955 | Arndt | Apr. 8, 1941 |
| 2,373,781 | Richardson | Apr. 17, 1945 |
| 2,433,125 | Kane | Dec. 23, 1947 |
| 2,490,455 | Nelson et al. | Dec. 6, 1949 |

FOREIGN PATENTS

| | | |
|---|---|---|
| 23,820 | Germany | Sept. 24, 1883 |
| 61,931 | Germany | Apr. 19, 1892 |
| 194,097 | Germany | Jan. 11, 1908 |
| 27,617 | Great Britain | Nov. 27, 1913 |
| 514,615 | Germany | Dec. 15, 1930 |
| 593,940 | Germany | Mar. 9, 1934 |
| 639,985 | Germany | Dec. 17, 1936 |
| 190,596 | Switzerland | July 16, 1937 |